Dec. 17, 1935.   F. W. SCHWINN   2,024,782
TUBE JOINT AND METHOD OF MANUFACTURING SAME
Filed April 9, 1934
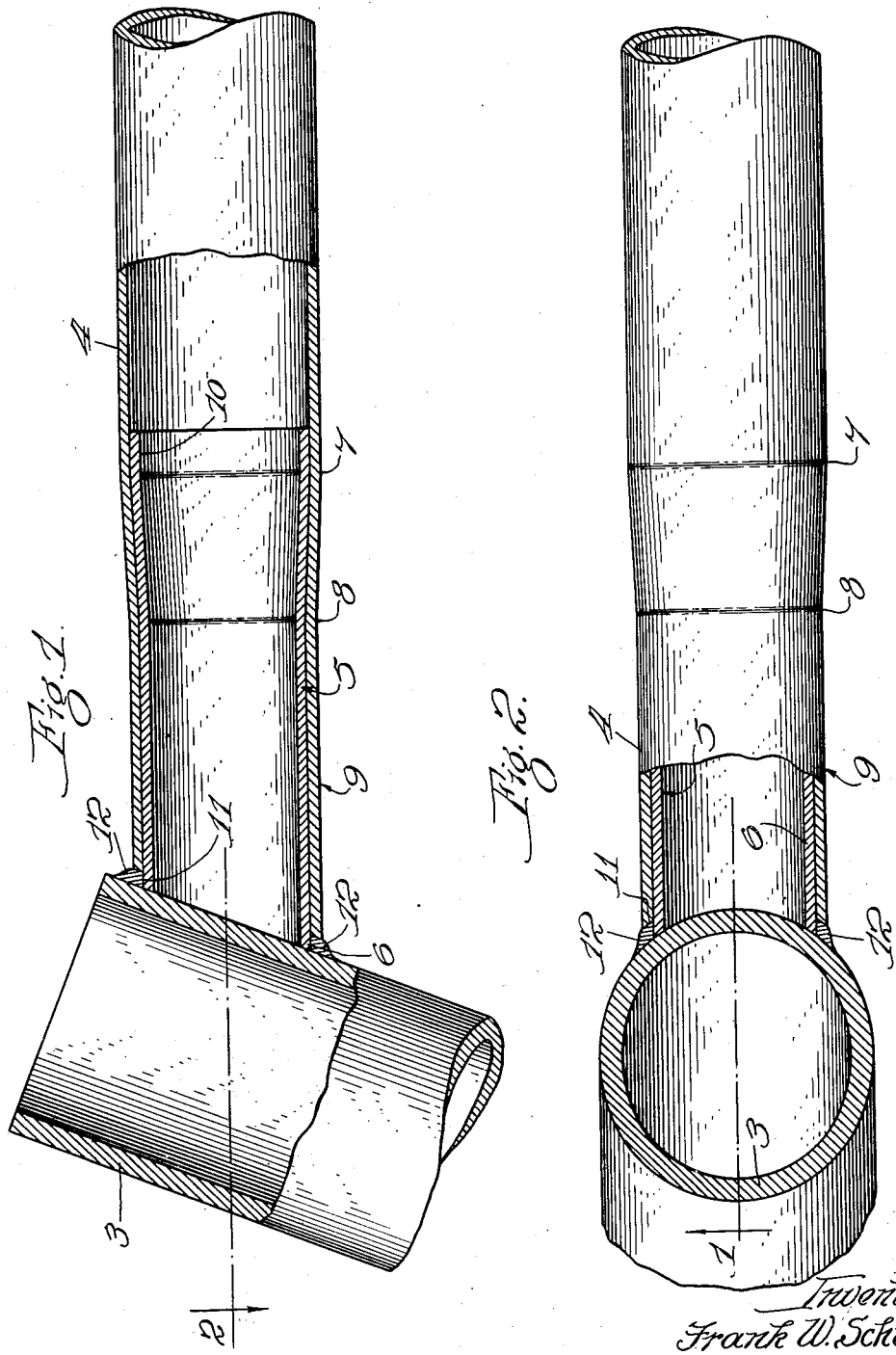
Inventor:
Frank W. Schwinn.

Patented Dec. 17, 1935

2,024,782

UNITED STATES PATENT OFFICE 2,024,782

TUBE JOINT AND METHOD OF MANUFACTURING SAME

Frank W. Schwinn, Chicago, Ill.

Application April 9, 1934, Serial No. 719,767

24 Claims. (Cl. 29—148.2)

My invention relates to the constructing of frames, such as for example bicycle frames and fuselages of airplanes, comprising members, such as for example and more particularly tubular members, disposed in angular position relative to each other, one phase of my invention relating to the reinforcing of the joint and another phase to the joint itself.

One of my objects is to improve the means hitherto employed for the reinforcing purpose and to reduce to the minimum danger of impairment of the frame under the stress of heavy loads and unusual shocks, and with the employment of the minimum of metal.

Another object is to provide a joint which, for the amount of metal used, will present the maximum amount of resistance to impairment; and other objects as will be manifest from the following description.

Referring to the accompanying drawing:

Figure 1 is a view in side elevation, partly sectional, of the adjacent ends of the tubular upper reach bar and the steering head tube of a bicycle frame of common shape, these parts being joined together and the upper reach bar reinforced, in accordance with my invention, the section being taken at the line 1 on Fig. 2 and viewed in the direction of the arrow; and Figure 2, a plan view, with certain parts sectioned, of the construction shown in Fig. 1, the section being taken at the line 2 on Fig. 1 and viewed in the direction of the arrow.

In the exemplification of my invention as illustrated, 3 represents the upper end of the steering head tube of a bicycle frame, and 4 the top tubular bar thereof which connects with the tube 3 and the seat post tube (not shown).

In accordance with my invention as illustrated the end tube 4 at which it is to be joined to the tube 3 is reinforced and the joint between these tubes produced, by first inserting into the end of the tube 4, usually of steel, a short length of tube 5 of similar metal to project a short distance beyond the adjacent end of the tube 4 as shown at 6, the tube 5, which preferably is of approximately the same thickness as the tube 4, being provided of such diameter that it may be manually pushed into the tube 4 to the position above referred to and thus have what is commonly known as a push fit with the tube 4.

The assembly of tubes 4 and 5 is then subjected to externally applied pressure, as for example by cold swedging them, for circumferentially constricting the tubes 4 and 5 in opposition to the resistance of the metal thereof to distortion, to reduce their diameters toward the end of the tube assembly 4, 5, at which the joint with the tube 3 is to be made.

In the particular construction shown the constricting of the tubes 4, 5 progressively increases from the line indicated at 7 to the line indicated at 8, the tube assembly therebeyond and represented at 9 being of uniform diameter but constricted relative to the other part of the tube assembly.

While the constriction of the tube assembly as shown in the drawing is quite pronounced, it being so shown to more clearly illustrate this feature; in practice the constriction need be only very slight. As for example in the case of the tube 4 being of one inch outside diameter a total constriction of .015, whereby the portion 9 of the tube assembly would be about .985 outside diameter, would suffice. Furthermore, while a portion of the tube 5, and represented at 10, is shown as in normal, unconstricted, condition, this is not necessary as the constricting of the tubes 4, 5 may be initiated at the inner extremity of the tube 5 in which case the tube 5 would terminate at the line 7.

The end of the tube 5 at which the joint is to be made with the tube 3 is so shaped, as shown, as to conformingly fit the side of the tube 3 and the adjacent end of the tube 4 which extends short of the tube 3 is correspondingly shaped. Thus when the tube assembly 4, 5 is applied to the tube 3 a continuous groove 11 is presented between the tubes 3 and 4.

The tube 3, and tube assembly 4, 5 having been assembled to the position they are to finally occupy, they are permanently secured together, as for example and preferably, by welding them with a welding rod the metal of which is run into the groove 11 as shown at 12 forming a ring weld and thus firmly uniting the tubes 4 and 5 together and to the tube 3.

As will be understood from the foregoing, the resistance to bending of the assembly 4, 5, which is at the maximum at its portion of greatest constriction, gradually decreases in intensity from the line 8 to the line 7 at which latter location no constriction exists and thus the tube 4 will not be subjected to such a bending moment as would tend to break it at this point.

While I have illustrated and described a particular embodiment of my invention and have described a certain method of procedure in the practicing of my improved method, I do not wish to be understood as intending to limit it thereto as the structure shown may be variously modified and altered and my improved method practiced in other ways without departing from the spirit of my invention.

What I claim as new, and desire to secure by Letters Patent, is:

1. The method of producing a reinforced tube which consists in inserting into the tube to be reinforced a reinforcing tube and subjecting the assembled tubes to external pressure over an axially extending area, in opposition to the resistance of the metal of the tubes to deformation, for reducing the diameters of both tubes toward an end thereof.

2. The method of producing a reinforced tube which consists in inserting into the tube to be reinforced to have push-fit therewith, a reinforcing tube and subjecting the assembled tubes to external, attenuating pressure over an axially extending area, in opposition to the resistance of the metal of the tubes to deformation.

3. The method of producing a reinforced tube which consists in inserting into the tube to be reinforced a reinforcing tube and swedging the assembled tubes to attenuate an end portion of the assembly over an axially extending area, in opposition to the resistance of the metal of the tubes to deformation, for reducing the diameters of both tubes toward an end thereof.

4. The method of producing a reinforced tube which consists in inserting into the tube to be reinforced a reinforcing tube and subjecting the assembled tubes to external, attenuating pressure over an axially extending area, in opposition to the resistance of the metal of the tubes to deformation, for reducing the normal diameters of both tubes toward an end thereof.

5. In the method of producing a tube joint, the steps which consist in inserting into the tube to be reinforced a reinforcing tube and subjecting the assembled tubes to external pressure, in opposition to the resistance of the metal of the tubes to deformation, for gradually reducing the diameters of both tubes toward an end thereof.

6. In the method of producing a tube joint, the steps which consist in inserting into the tube to be reinforced a reinforcing tube and subjecting the assembled tubes to external pressure, in opposition to the resistance of the metal of the tubes to deformation, for gradually reducing the diameters of both tubes toward an end thereof and therebeyond reducing the tubes to uniform diameter.

7. A tube assembly comprising a main tube and a reinforcing tube therein throughout a cylinder, said tubes being constricted, against the resistance of the metal of the tubes to distortion, adjacent the end of the assembly at which it is to be joined to another member.

8. A tube assembly comprising a main tube and a reinforcing tube therein over an axially extending area, said tubes being gradually constricted, against the resistance of the metal of the tubes to distortion, toward the end of the assembly at which it is to be joined to another member.

9. A tube assembly comprising a main tube and a reinforcing tube therein, said tubes being constricted throughout a cylinder, against the resistance of the metal of the tubes to distortion, toward the end of the assembly at which it is to be joined to another member, the constriction of the reinforcing tube extending from a portion thereof which remains of normal diameter.

10. A tube assembly comprising a main tube and a reinforcing tube therein, said tubes being jointly constricted at an end portion, against the resistance of the metal of the tubes to distortion, said constriction gradually decreasing from a point between the ends of said portion in a direction away from the adjacent end of the assembly.

11. A tube assembly comprising a main tube and a reinforcing tube therein, said tubes being jointly constricted at an end portion, against the resistance of the metal of the tubes to distortion, said constriction gradually decreasing from a point between the ends of said portion in a direction away from the adjacent end of the assembly, and the constriction of the reinforcing tube extending from a portion thereof which remains of normal diameter.

12. A tube-joint comprising members one of which is a tube to be connected with the other of said members at a side of the latter, a reinforcing tube in said first-referred-to tube projecting beyond the adjacent end of the latter at the joint, whereby a groove is presented between an end of said first-referred-to tube and said other member, and bonding material fused into said groove and connecting said tubes and member together.

13. A tube-joint comprising members one of which is a tube to be connected with the other of said members at a side of the latter, a reinforcing tube in said first-referred-to tube projecting throughout its circumference beyond the adjacent end of said first-referred-to tube at the joint, whereby a continuous groove is presented between an end of said first-referred-to tube and said other member, and bonding material fused into said groove throughout the circumference of the latter and connecting said tubes and members together.

14. A tube-joint comprising members one of which is a tube to be connected with the other of said members at a side of the latter, and a reinforcing tube in said first-referred-to tube projecting beyond the adjacent end of the latter at the joint, whereby a groove is presented between an end of said first-referred-to tube and said other member, said tubes and member being connected together by a weld at said groove.

15. A tube-joint comprising members one of which is a tube to be connected with the other of said members at a side of the latter, and a reinforcing tube in said first-referred-to tube projecting throughout its circumference beyond the adjacent end of said first-referred-to tube at the joint, whereby a continuous groove is presented between an end of said first-referred-to tube and said other member, said tubes and member being connected together by an annular weld at said groove.

16. In the production of a tube joint, the steps which comprise inserting a reinforcing tube into the tube to be reinforced and subjecting the assembled tubes to external pressure adjacent an end thereof, over a substantial portion of their extent parallel with their axes and uniformly about the circumference of said portion to reduce the diameters of both tubes against the resistance of the metal of the tubes to deformation.

17. In the production of a tube joint, the steps comprise inserting a reinforcing tube into an end of the tube to be reinforced and subjecting the assembled tubes to external pressure adjacent said end over a substantial portion of their extent parallel with their axes and uniformly about the circumference of the tubes, said pressure gradually varying along said extent whereby to reduce the diameters of said portions of both tubes, the reduction of diameters gradually lessening in amount in a direction away from said end.

18. A tube assembly comprising a main tube and a reinforcing tube therein, said tubes being so reduced in diameter from their normal dimensions over an axial cylinder toward an end of the assembly at which it is to be joined to another member, as to provide great frictional cohesion between the tubes.

19. A tube assembly comprising a main tube, a reinforcing tube therein terminating at a location spaced from an end of the main tube, and means producing relatively great frictional cohesion between the tubes adjacent said end and relatively slight frictional cohesion at said termination of the reinforcing tube.

20. A tube assembly comprising a main tube, a reinforcing tube therein terminating at a location spaced from an end of the main tube, and means producing relatively great frictional cohesion between the tubes adjacent said end and relatively slight frictional cohesion at said termination of the reinforcing tube, said frictional cohesion gradually lessening from an area of great cohesion as the said termination is approached.

21. A tube assembly comprising a main tube having an attenuated portion of reduced diameter, a reinforcing tube in said portion extending from an end of the main tube and terminating at a location spaced from said end, means to positively prevent movement between the ends of said tubes and means providing frictional cohesion between said tubes adjacent said ends.

22. A tube joint comprising a tubular member, a tube assembly secured to a side of said member, said assembly comprising a tube and a reinforcing tube therein and projecting therefrom to contact said side of said member whereby to provide a groove between the end of said first named tube and said side, the securing means comprising bonding material fused into said groove to immovably secure the ends of said assembly together and to said side, means to provide relatively great cohesion between the tubes of said assembly adjacent their ends and relatively slight cohesion therebetween at a location spaced from said ends.

23. In a tube joint assembly, a main tube, a reinforcing tube in said main tube, adjacent ends of said tubes from a location intermediate the ends of the tube joint assembly being of decreased diameters toward one end of the tube assembly, one of said tubes projecting beyond the other tube at the latter end.

24. In a tube joint assembly, a main tube, a reinforcing tube in said main tube, the adjacent ends of said tubes being of decreased diameters toward an end of the tube assembly, one of said tubes projecting beyond the other tube at said end, and a weld connecting the tubes at said end.

FRANK W. SCHWINN.